ns Patent [19]
Müller et al.

[11] 3,751,926
[45] Aug. 14, 1973

[54] METHOD OF ERECTING WALL STRUCTURES IN MINE WORKINGS

[75] Inventors: Rudolf Müller, Friedrichsthal; Herbert Zenner, Siersburg, both of Germany

[73] Assignee: Gebr. Knauf Wesldeulsche Gipswerke Saarbergwuerke Aktiengesellschaft, Iphofen, Germany

[22] Filed: Nov. 12, 1970

[21] Appl. No.: 89,112

[30] Foreign Application Priority Data
Nov. 14, 1969 Germany.................. P 19 57 263.5

[52] U.S. Cl................................................ 61/36 R
[51] Int. Cl............................................. E02d 3/12
[58] Field of Search.................... 61/36 R; 106/109, 106/110, 111, 112, 113

[56] References Cited
UNITED STATES PATENTS

| 2,560,619 | 7/1951  | Wertz ..................................... 61/36 |
| 2,434,301 | 1/1948  | Wertz ..................................... 61/36 |
| 3,086,953 | 4/1963  | Nitzsche ........................... 106/111 X |
| 2,210,545 | 8/1940  | Hamilton ............................ 61/36 X |
| 2,655,004 | 10/1953 | Wertz ...................................... 61/36 |
| 2,791,511 | 5/1957  | Lipkind............................... 106/109 |

FOREIGN PATENTS OR APPLICATIONS
639,287   4/1962   Canada............................. 106/112

OTHER PUBLICATIONS
Lea & Desch, "The Chemistry of Cement and Concrete," Edward Arnold Ltd. London, 1956, pp. 517–520.

*Primary Examiner*—David J. Williamowsky
*Assistant Examiner*—David H. Corbin
*Attorney*—Holman & Stern

[57] ABSTRACT

A gypsum cement mixture which can be pumped underground for forming wall structures in mine workings comprising a material improving the flow properties of the gypsum cement-water mixture, an additive endowing hydrophobic properties, a colloid which is at the most weakly ionogenic, and a latently hydraulic material.

28 Claims, No Drawings

METHOD OF ERECTING WALL STRUCTURES IN MINE WORKINGS

The present invention relates to methods for erecting walls in mine working and more particularly to such methods in which gypsum cement is mixed with water to form a water-gypsum cement slurry which can be pumped, and the slurry is pumped through pipes to site.

One aim of the invention is to provide an advantageous further development of such methods. In particular the invention is concerned with the development of types of gypsum cement which are particularly suitable for the method.

In accordance with the invention in a method for the erecting of walls in mine working the gypsum cement, which is mixed with water to form a gypsum-water slurry which is pumped to the site of application. The gypsum cement comprises a material (0.05 to 1.0 percent) which improves the flow properties of the water-gypsum cement slurry by reducing tackiness and/or a material (0.05 to 0.2 percent) which reduces viscosity to improve flow properties, and also an additive (0.005 to 0.5 percent) endowing hydrophobic properties, a colloid (0.005 to 0.6 percent) which is non-ionogenic or at the most only slightly ionogenic, and a finely ground latently hydraulic material (5 to 20 percent).

The material for improving the flow properties by reducing tackiness can be selected from the group comprising: epoxidated soya oil, fatty acid ester with partially unsaturated components, long chain paraffin, and stearate.

The material for improving the flow properties by reducing viscosity can be the residue obtained by drying waste sulphite liquor.

It may be convenient to add to the gypsum cement, which is preferably a plaster gypsum cement, a material which delays solidification, and a regulating substance (stabilising substance) which fixes the rate of solidification, for example a mixture of gypsum hydrate with a hydraulic binding agent. The advantages of the method can be best exploited, if the solidification of the gypsum cement begins at the earliest after about 5 minutes, preferably after about 7 minutes, and ends at the latest after 25 minutes, preferably before about 18 minutes. Preferred materials and quantities of the additives are indicated below.

Preferably the gypsum cement is continuously mixed and continuously pumped. For pumping an eccentric-worm pump is particularly convenient. It is, however, possible to make use of a piston pump.

The gypsum cement can be a gypsum cement adapted for use in internal plastering or one intended for making stucco.

With the method in accordance with the invention it is possible to produce explosion resistant walls for combatting fires more rapidly than was previously the case and with a considerable reduction in danger to workers. Also it is possible to reduce the costs of producing such walls.

The water gypsum cement slurry can be pumped horizontally for at least 450 meters and vertically for at least 80 meters so that the workers operating the mixing and pumping installation and those concerned with transport of the gypsum sacks can generally operate outside the immediate danger zone, while at the site where the wall is to be made only two or three men are necessary. In the case of workings with a cross-section with an area of up to 16 square meters wall thicknesses (or lengths measured in the direction of the working) sufficient for producing the necessary resistance to explosion of only 1.5 meters are sufficient, so that comparatively little constructional material has to be brought up and worked; furthermore there is the fact that high conveyance speeds of approximately 10 cubic meters per hour can be achieved. The gypsum cement hardens so quickly that the layer which is still liquid has a comparatively small height and exerts little hydrostatic pressure on the shuttering. For this reason the shuttering can be made extremely light in construction. It is sufficient if a grid of wood or metal is erected and is used to support canvas sheeting. The construction of the shuttering and the filling of the gypsum cement into the shuttering can in fact be carried out partially simultaneously since the gypsum cement can be filled into the bottom of the shuttering while the top part of the shuttering is still being completed. Due to the rapid hardening of the gypsum cement it is possible to stand on the gypsum cement already put in place to form the bottom of the wall. A man only sinks to a depth of 20 cms in the gypsum cement. Furthermore the surrounding air at the site remains completely free of dust. The saving in time due to these features and the case in working constitutes such a substantial improvement that for the construction of an explosion resistant wall in a mine working with a cross-sectional area of 13 square meters only about one shift is needed. Furthermore the saving in costs due to this manner of operation is significant, especially as local transport difficulties can be overcome due to the substantial pumping distances which are possible.

Furthermore the quality of the wall produced is extremely high. The gypsum cement wall is extremely tough, free of cavities and resistant to explosion. In the rock it forms a firedamp-proof closure.

The method in accordance with the invention can be used not only in the case of the construction of an explosion resistant wall in mine working, but can also be used for other purposes in mining operation. It can be used for example for temporarily closing working or fixed walls, the formation of anchoring means for permanent sealing walls in working, for holding back explosive waves resulting from blasting operations and also for sealing holes in mine working, as is often necessary in combatting covered mine fires. In the latter case a support wall or shuttering structure is arranged at the working face of the mine working so as to be parallel to the axis of the working. Then the space remaining between the shuttering and the adjacent rock is filled with water-gypsum cement slurry.

A further application resides in the placing of walls or dams in workings which have already been walled off and are filled with firedamp. In this case for erecting shuttering and supervising the pumping of the material into position it is only possible for members of the emergency squad of the mine equipped with gas masks to go into the space which has already been walled off, all other operations, more particularly those requiring much physical strength, can be carried out outside the walled off space in a stream of fresh air. Since the method does not make necessary any supply of fresh air to the position at which the wall is to be constructed, no transitional zone with explosive gas and air mixtures can be formed. The use of the method in accordance with the invention therefore not only leads to substantial savings in time and costs in combatting and restricting fires in mine working, but also to an increase in the safety of the emergency squad.

Finally the method can be used advantageously in the investigation of collapses underground. In such cases it may often be a question of a collapse of a working. In this case the cavity left by the coming out of position of the original filling material can be filled with water-gypsum cement slurry so that the original state of the rock is restored and further discharge of filling from the crack or fault is avoided. Accordingly the wording used describing the present method "A method for erecting walls" is to be understood to include also the stopping of a collapse in a mine working.

As an example of the method the following describes the construction of an explosion resistant wall in a working in detail, in order to combat an underground fire:

In a mine working at a position which was as advanced as possible two shuttering walls were erected with a spacing of about 1.5 meters between them. The shuttering walls were erected perpendicularly to the axis of the working so as to extend across its entire cross-section. Each shuttering wall comprised for example boards which were joined together by nailing. Then a piece of canvas was nailed over the boards. At a safe position up to a few hundred meters removed from the site a mixer and a pump was set up. A flexible pipe was between the pump and the site for the erection of the wall, the pipe ending between the two shuttering walls. The pump could advantageously be an eccentric-worm pump while the pipe could be firefighting hose with external and internal rubber coating.

The gypsum cement, which can be kept at least 1 year in paper sacks lined with polyvinyl acetate, was poured out of the sacks into the mixer and was continuously stirred with water and was drawn off by the pump from the mixer. For example the plaster cement can be plastering gypsum cement fired on a sintering conveyor. To the plaster cement the following additives are added: 0.1 to 0.2 percent of alkaline earth metal stearate to counter tackiness, 0.05 to 0.06 percent residue obtained by drying waste sulphite liquor to reduce viscosity, 0.01 to 0.05 percent potassium siliconate as an organosiloxane to provide for hydrophobic properties, 10 to 12 percent blast furnace slag very finely ground, 0.01 to 0.1 percent hydrolysed protein and starch as the weakly ionogenic colloid being present in an amount of from 0.05 to 0.6 percent. The water-gypsum cement factor was set of approximately 0.6 in the case of such a gypsum cement material. The water factor is correctly set when the water-gypsum cement slurry flows from the end of the pipe with the consistency of thin cream. In order to control the flow it is therefore necessary to provide a telephone connection between the mixing and pumping installation and the site at which the wall is formed.

As the level of gypsum cement rises the end of the flexible pipe is raised step by step. As already mentioned it is possible to tread on the gypsum cement material forming the wall, something which makes it possible to work between the two shuttering walls to complete them while filling is taking place.

What we claim is:

1. A method for erecting wall structures in mine workings which comprises mixing gypsum cement with water; pumping the cement and water after mixing through a pipe to the site of erection of the wall structure; depositing the gypsum cement water mixture at the erection site; and allowing the mixture to solidify to form the desired wall structure, the gypsum cement containing: (a) material improving the flow properties of the gypsum cement-water mixture; (b) an additive endowing hydrophobic properties; (c) a colloid which is at the most weakly ionogenic; and (d) a finely ground latently hydraulic material.

2. A method in accordance with claim 1 in which the gypsum cement used further comprises an additive adapted to delay solidification, the solidification of the gypsum cement beginning at the earliest after 5 minutes and ending at the latest after 25 minutes.

3. A method in accordance with claim 1 in which the gypsum cement used further comprises a regulator fixing the rate of solidification, the solidification of the gypsum cement beginning at the earliest after 5 minutes and ending at the latest after 25 minutes.

4. A method in accordance with claim 2 in which the solidification of the gypsum cement begins after 7 minutes and ends before 18 minutes.

5. A method in accordance with claim 1 in which the gypsum cement is a gypsum cement adapted for use for internal plastering.

6. A method in accordance with claim 1 in which the gypsum cement is a gypsum cement intended for making stucco.

7. A method in accordance with claim 1 in which the material improving the flow properties is selected from the group consisting of: epoxidated soya oil, fatty acid ester with partially unsaturated components, long chain paraffin, and stearate.

8. A method in accordance with claim 7 in which the material improving the flow properties is present in a quantity of 0.05 to 1.0 percent.

9. A method in accordance with claim 1 in which the material improving the flow properties is residue obtained by drying waste sulphite liquor.

10. A method in accordance with claim 9 in which the residue is present in a quantity of 0.05 to 0.2 percent.

11. A method in accordance with claim 1 in which the hydrophobic additive is an organosiloxane.

12. A method in accordance with claim 11 in which the organosiloxane is present in a quantity between 0.005 and 0.05 percent.

13. A method in accordance with claim 1 in which the colloid is present in a quantity between 0.05 and 0.6 percent.

14. A method in accordance with claim 1 in which the latently hydraulic material is present in a quantity of 5 to 20 percent.

15. A method in accordance with claim 14 in which the latently hydraulic material is blast furnace slag.

16. A method in accordance with claim 2 in which the delaying additive is present in a quantity of 0.005 to 0.2 percent.

17. A method in accordance with claim 1 in which the gypsum cement is continuously mixed with the water and continuously pumped.

18. A method in accordance with claim 1 in which the gypsum cement is conveyed with an eccentric-worm pump to the site at which the wall is formed.

19. A method in accordance with claim 1 in which the wall structure is formed for combatting underground fires.

20. A method in accordance with claim 1 in which the wall structure formed is used for making a temporary closure to a working.

21. A method in accorance with claim 1 in which the wall structure comprises anchoring abutments for dam zones.

22. A method in accordance with claim 1 in which the wall structure is used for holding back blast produced during blasting operations underground.

23. A method in accordance with claim 1 in which the wall structure is used for filling out of pre-existing wall structure in mine workings.

24. A method in accordance with claim 1 in which the wall structure is formed in a chamber which is already walled off.

25. A method in accordance with claim 1 in which for forming the wall shuttering is used made up of grid-like structures covered with sheeting.

26. A method in accordance with claim 1 in which during the construction of upper parts of shuttering used for forming the wall structure the water-gypsum cement mixture is pumped into the bottom part between the shuttering.

27. A method in accordance with claim 1 in which the wall structure is used for filling a cavity in a mine.

28. A method in accordance with claim 1 in which the wall structure is used for filling a callapsed portion in the mine working.

* * * * *